Oct. 7, 1924.

J. WADDICOR, JR 1,510,724

VEHICLE HEADLAMP

Filed Jan. 10, 1924

Inventor:
James Waddicor Jnr.
By his Attorney: Walter Gunn

Oct. 7, 1924.  
J. WADDICOR, JR  
1,510,724  
VEHICLE HEADLAMP  
Filed Jan. 10, 1924  
2 Sheets-Sheet 2
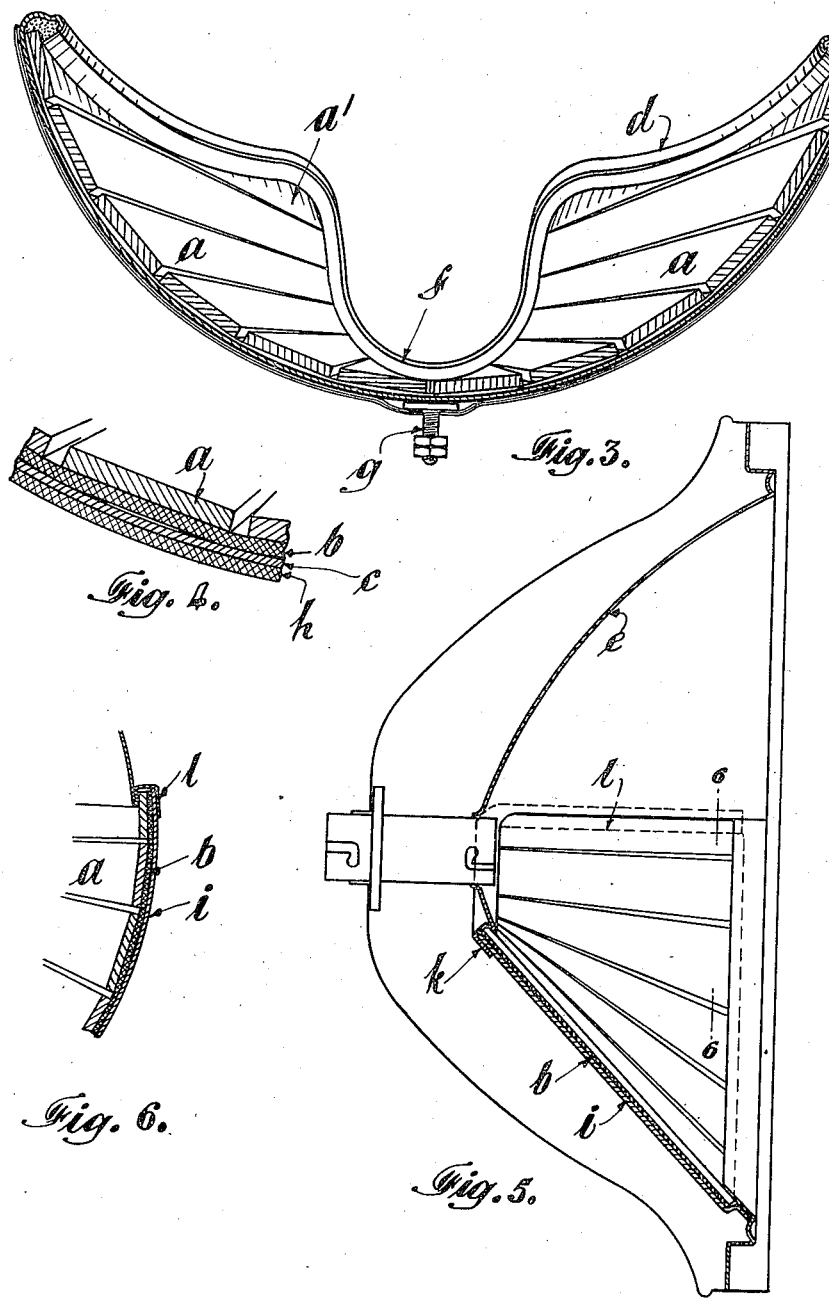
Inventor:
James Waddicor Jnr.
By his Attorney: Walter Gunn Patented Oct. 7, 1924.

1,510,724

UNITED STATES PATENT OFFICE.

JAMES WADDICOR, JR., OF BOLTON, ENGLAND.

VEHICLE HEADLAMP.

Application filed January 10, 1924. Serial No. 685,404.

*To all whom it may concern:*

Be it known that I, JAMES WADDICOR, Jr., a subject of the King of Great Britain and Ireland, residing at Bolton, Lancashire, England, have invented new and useful Improvements in or Relating to Vehicle Headlamps, of which the following is a specification.

This invention refers to the head lamps of motor road and other vehicles, and especially those illuminated electrically. Such lamps as at present made are highly polished or plated on their interior surface, and the reflective properties of such surface below and above the usual lamp bulb are equal. Now the bulk of the light for lighting the roadway is obtained from the top or upper part of the lamp reflective surface, and that obtained from the lower part is mainly effective in throwing a beam of light forwardly and upwardly, and dazzling the drivers of on-coming vehicles. The object of this invention is so to modify the said reflective surface of a head lamp that the light shall not dazzle the drivers of on-coming vehicles, and said light shall be applied to greater advantage in lighting up the roadway.

According to the invention, a segmental lining or fitment of opaline or milk-white glass or other material having a like light diffusing or absorbing surface, is fitted inside the lamp and below the level of the lamp bulb, the said material extending from a point near the front of the lamp to a point behind the bulb, and covering about a third or half the lamp reflective surface.

The effect of said material, which is less reflective than the polished and plated lamp surface, is that the rays of light thrown thereon are damped down and in part directed upwards against the top of the lamp, instead of forwardly, thus helping in the lighting of the roadway and not dazzling the drivers of other vehicles.

The invention will be more particularly described by the aid of the accompanying drawings, wherein:—

Figure 3 is a cross-sectional view on the line 3—3, Figure 2 looking in the direction indicated by the arrow heads drawn to an enlarged scale.

Figure 4 is a detail sectional view showing more clearly the method of building up.

Figure 5 is a sectional elevation of a form of the anti-dazzle device formed in one with the reflector.

Figure 6 is a detail sectional view on the line 6—6, Figure 5.

Figure 1:
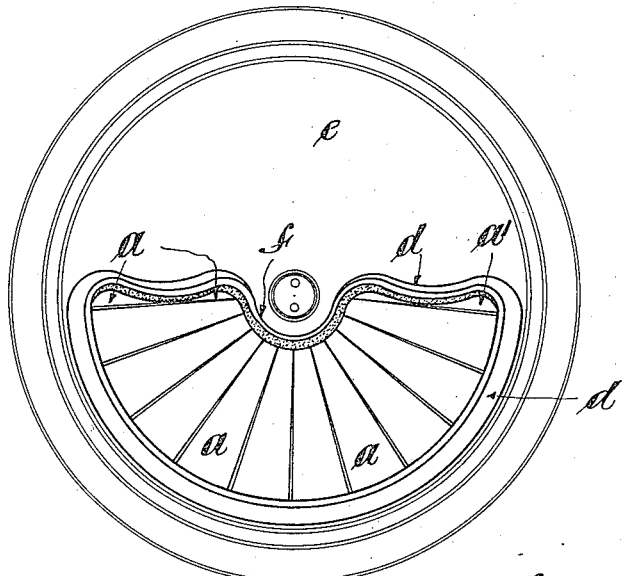
Figure 1 is a front view of a head lamp for a motor road vehicle showing the invention applied.
Figure 2:
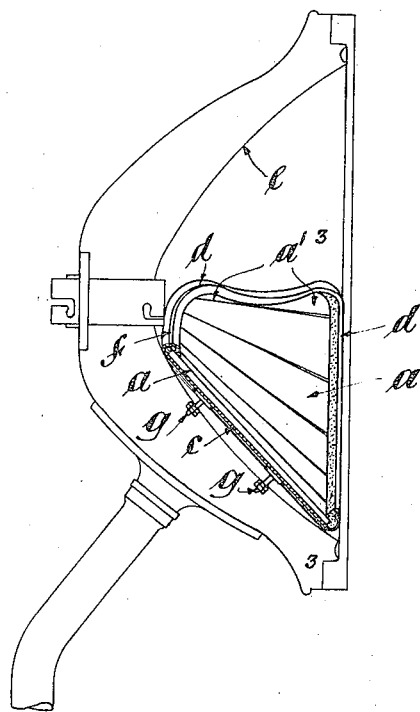
Figure 2 is a sectional elevation of Figure 1.

In one example shown in Figures 1 to 4, the device is made up of a series of strips or pieces of opaline glass $a$, $a$ mounted side by side and secured by an adhesive to a canvas or fibre backing $b$ common to all. The strips $a$ taper towards one end, and collectively form a half cone or thereabouts, of a size suitable for fitting within a head lamp.

The strips $a$ of opaline glass secured to the backing $b$ are mounted in a sheet metal shell $c$ having a flange $d$ securing the mounted opaline strips $a$ in position. Said shell $c$ is a facsimile of the lower part of the usual reflector $e$ and is shaped with a semi-circular opening $f$ to give clearance for the lamp bulb.

The shell $c$ is provided with two studs or bolts $g$ by means of which it may be bolted to the usual reflector $e$ which is pierced with two small holes for this purpose. The outside of the shell $c$ is provided with rubber or fibre or hair buffers and one or more layers $h$ of fabric or rubber secured thereto by an adhesive in order to prevent rattling.

The outer side edges of the band and strips of glass i. e., the anti-dazzle device as a whole when in the lamp, extend to a height on a level with the lamp or nearly so and instead of using the opaline glass in strip form such glass may be moulded in one piece to the correct shape. The outermost strips $a$ or edges of the device affect the lateral rays of light and help to prevent same being thrown outwards on to a footpath.

In Figures 5 and 6 a somewhat similar construction is shown but in this case the opaline glass $a$ secured by an adhesive upon a backing of canvas fibre $c$ or the like, is arranged on the lower portion of the inner shell $i$ of the lamp and at the end near the lamp bulb socket $j$ the glass enters a recess formed by a metal strip $k$ attached to the shell and bent downwards towards the front end of the lamp. Similar metal strips $l$ are attached to the shell alongside the opaline glass and turned over on to the edges of the glass, while a further metal strip is attached to the front edge of the shell which after sliding the opaline glass into position, is also folded inward and over the glass, which is then surrounded on all four sides and firmly held in position.

The side flanges $m$ may be shaped to extend laterally top and bottom to hold segmental pieces of opaline glass. The opaline glass may be in one piece, curved to the shape of the inner shell of the lamp or it may be made in strip form, a series of strips being arranged side by side, and fastened to a backing common to all as shown.

In a further modification, the metal flanges may be in one with a plate arranged between the opaline glass and lamp shell, and soldered or riveted to the shell, the edges of the plate forming the flanges which when folded down collectively form a frame for the glass.

Although preferring to provide a special or substitute shell for the lamp, the improved metal flanges or frame for holding the opaline glass may be applied to the ordinary inner lamp shell. The advantage of providing a separate shell is that it can be made and fitted with the anti-dazzle device, ready for application to standard makes of lamps, and without mutilating or altering the usual inner shell.

With the strips of opaline glass lying at the angle shown, the light of the lamp is reflected mainly by the upper polished part of the lamp, and thrown forward and downwards on to the roadway, the light thrown on to the strips of glass $a$ being absorbed (rather than reflected) and any reflection tending to be diffused and thrown back on to the top reflective surface of the lamp. In any case, the opaline glass has the effect of preventing a strong blinding light being thrown into the eyes of the drivers of on-coming vehicles, or into the eyes of pedestrians walking along an adjacent footpath.

To facilitate the control of lateral reflection, small sectional strips $a^1$ of opaline glass may be arranged on the horizontal edges of the device. If unnecessary these can be turned down behind the cloth or rubber backing, or detached.

By making the glass in strips the device can be readily applied to lamps of slightly varying curvature or sizes. Usually, the device will be made in a variety of sizes, large, medium and small.

Although preferring to make the improved anti-dazzle device from strips of opaline glass, it may be made of opaline glass moulded to the shape of the lower half of the lamp reflector and fitted so as to lie close to and follow the contour of the reflective surface.

Although preferring opaline glass, cardboard, wood, or sheet metal painted or enamelled with a paint similar in shade and lustre to opaline glass may be used.

What I claim is:—

1. Anti-dazzle device for vehicle head lamps comprising a series of tapered strips of opaline glass or the like, a flexible backing upon which the strips are mounted so as to form a segmental lining for the lower part of the lamp, and means for securing the lining in position, substantially as described.

2. Anti-dazzle device for vehicle head lamps comprising an opaline glass lining for the lower part, a metal shell in which said lining is secured, a layer of resilient material attached to both sides of the shell and means to connect said shell to the lamp casing, substantially as described.

In testimony whereof I have signed my name to this specification.

JAMES WADDICOR, Jr.